May 7, 1963 E. C. LLOYD ET AL 3,088,168
MULTIPLE-ANVIL HIGH PRESSURE APPARATUS
Filed Jan. 26, 1960 3 Sheets-Sheet 1

INVENTORS
EDWARD C. LLOYD
ULRIC O. HUTTON
DANIEL P. JOHNSON
HENRY J. ZORANSKI
BY
*John C. Stahl*
ATTORNEY May 7, 1963   E. C. LLOYD ET AL   3,088,168
MULTIPLE-ANVIL HIGH PRESSURE APPARATUS
Filed Jan. 26, 1960   3 Sheets-Sheet 2
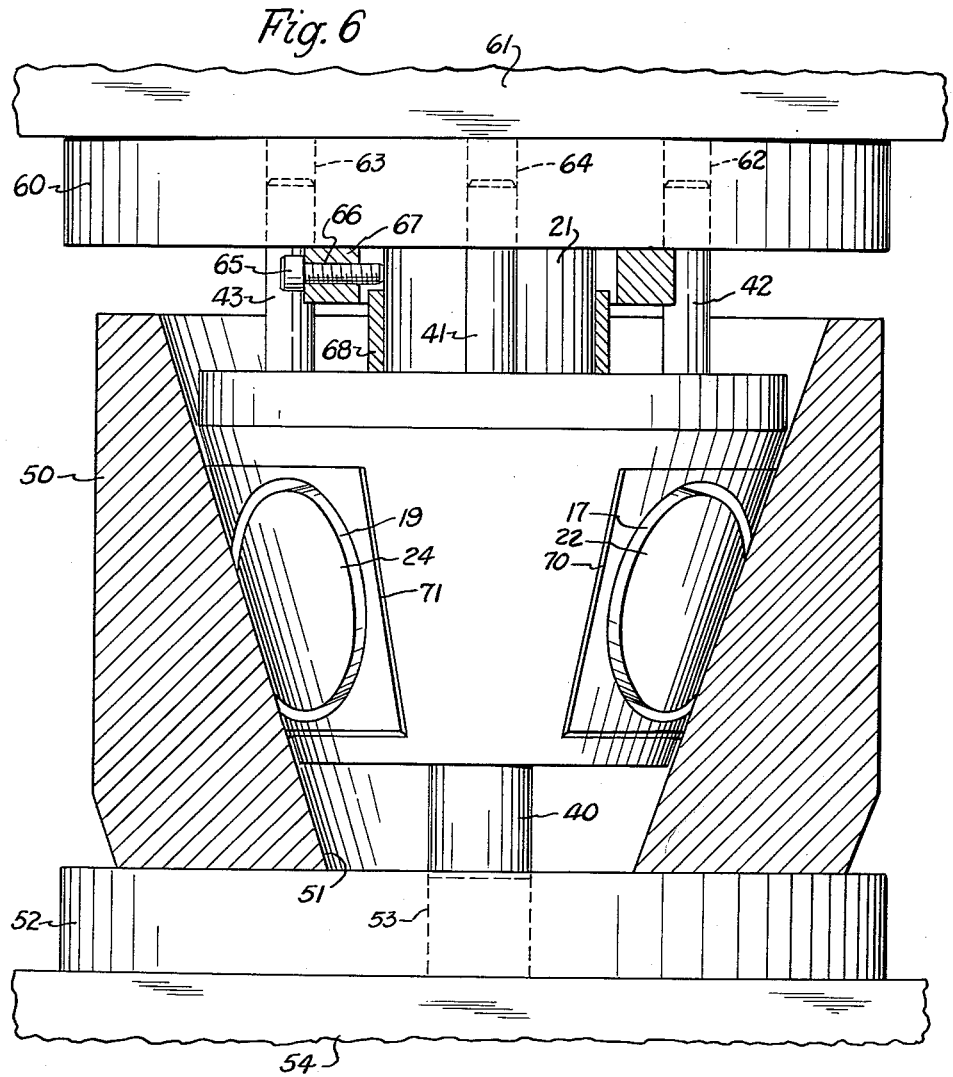
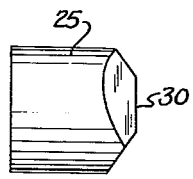
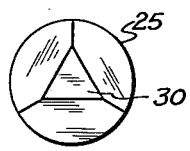
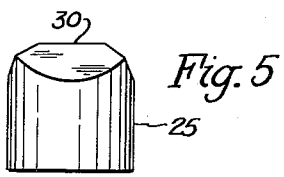
INVENTORS
Edward C. Lloyd
Ulric O. Hutton
Daniel P. Johnson
Henry J. Zoranski
BY John C. Stahl
ATTORNEY May 7, 1963 E. C. LLOYD ET AL 3,088,168
MULTIPLE-ANVIL HIGH PRESSURE APPARATUS
Filed Jan. 26, 1960 3 Sheets-Sheet 3

INVENTORS
EDWARD C. LLOYD
ULRIC O. HUTTON
DANIEL P. JOHNSON
HENRY J. ZORANSKI
BY
John C. Stahl
ATTORNEY United States Patent Office 3,088,168
Patented May 7, 1963

3,088,168
MULTIPLE-ANVIL HIGH PRESSURE APPARATUS
Edward C. Lloyd, Silver Spring, Ulric O. Hutton, Brinklow, Daniel P. Johnson, Silver Spring, and Henry J. Zoranski, Chevy Chase, Md., assignors to the United States of America as represented by the Secretary of Commerce
Filed Jan. 26, 1960, Ser. No. 4,836
Claims priority, application Canada Aug. 13, 1959
8 Claims. (Cl. 18—16)

This invention relates generally to high pressure apparatus an, more particularly, to a tetrahedral press. By a tetrahedral press is meant apparatus wherein there are four pressure multiplying anvils each of which press against one of the four faces on an object in the form of a regular tetrahedron to exert high pressure on the object by simultaneous inward movement of the pressure multiplying anvils.

A tetrahedral press of this type is disclosed in U.S. Patent No. 2,918,699, "High Pressure Press" by Howard T. Hall. The same press is also disclosed in the following articles by H. T. Hall: "Some High Pressure, High-Temperature Apparatus Design Considerations: Equipment for Use at 100,000 Atmospheres and 3,000° C." published at pages 267–275, vol. 29, of The Review of Scientific Instruments (1958); "Ultrahigh-Pressure Research" published at pages 445–449 of the August 29, 1958, issue of Science; and "High-Pressure Developments" published in vol. 9, pages 395–416 of the American Review of Physical Chemistry (1958).

In the Hall type of press, a sample to be compressed is encased by a body of gasket material which is externally shaped in the form of a regular tetrahedron. The gasket or buffer material has high wall friction and low compressibility, and may be, for example, pyrophillite. Each of the four faces of the body is contacted by the smaller end of one of four wedge-shaped anvils. The anvils are aligned to have their center lines of action coincide with the four axes of the tetrahedron which are right angles to the faces thereof and which pass through the centers of such faces to intersect at the center of the tetrahedron.

In operation, the anvils are simultaneously driven inwardly against the tetrahedron under pressure applied to their larger outer ends. Each anvil acts as a pressure multiplying device in that the pressure exerted by its inner end exceeds the pressure applied to its outer end by a multiple which is approximately of the same valve as the ratio of the area of the outer end is to the area of the inner end. Hence, under suitable applied pressure, the anvils are capable of exerting a pressure in the order of 10,000 atmospheres upon the tetrahedron and upon the sample encased therein.

In the Hall type of apparatus, an independent force is externally applied to each anvil. Also, the press employed by Hall to actuate his anvils is of a particular design wherein (1) the four anvils are each separately driven by one of four hydraulic rams, (2) a special tetrahedral frame is employed to mount the four ram-and-anvil units in suitable disposition to compress the central object, and (3) the driving actions of the rams are externally synchronized to assure simultaneous and equal inward movements of all anvils.

Objects of this invention are to provide a tetrahedral press in which an external force need be applied to less than all of the anvils, which is capable of being actuated by pressure from a conventional hydraulic press, is compact and susceptible to easy manipulation and rapid assembly and disassembly, and in which the tetrahedral press may be used as a two-stage pressure device.

These and other objects are realized by providing a retaining ring which is coaxial with a first of four anvils in tetrahedral disposition about a central tetrahedral object, and which surrounds the second, third and fourth anvils. The outer ends of the latter three anvils rest against the inner wall of the ring. This inner wall is conically tapered in the axial direction of the ring to close toward the axis thereof as the distance from the first anvil increases. Preferably, the outer ends of the second, third and fourth anvils are lubricated to render them free sliding in the axial direction.

In operation, the smaller ends of the four anvils are positioned to bear lightly against the four faces of the central tetrahedral object. As described, this object may be a body of buffer material encasing a sample to be compressed. Thereafter, axially directed force is applied to the outer end of the first anvil to drive in towards the other three anvils. This axially directed force is imparted through the buffer material to the other three anvils to displace their outer ends over the inner wall of the ring in the direction of motion of the first anvil.

Because of the conical taper of the ring's inner wall, the displacement of the second, third and fourth anvils is accompanied by a wedging action of the wall which drives the last-named anvils towards the central tetrahedral object. Hence, the results of the application of the mentioned force to the first anvil is to produce simultaneous inward movement by all four anvils. The first anvil presses upon the object in response to the force applied thereto. The second, third and fourth anvils press upon the object in response to the wedge reaction forces exerted thereon from the inner wall of the ring. By appropriate selection of the angle of taper of the ring's inner wall, the pressures of all four anvils on the central object are rendered equal.

For a better understanding of the invention, reference is made to the following description and to the accompanying drawings wherein:

FIG. 3 is a plan view showing in detail the front end configuration of the hard end piece of one of the anvils of the subassembly on FIG. 1;

FIGS. 4 and 5 are, respectively, a side elevation and a front elevation of the hard end piece shown in FIG. 3;

Figure 1:
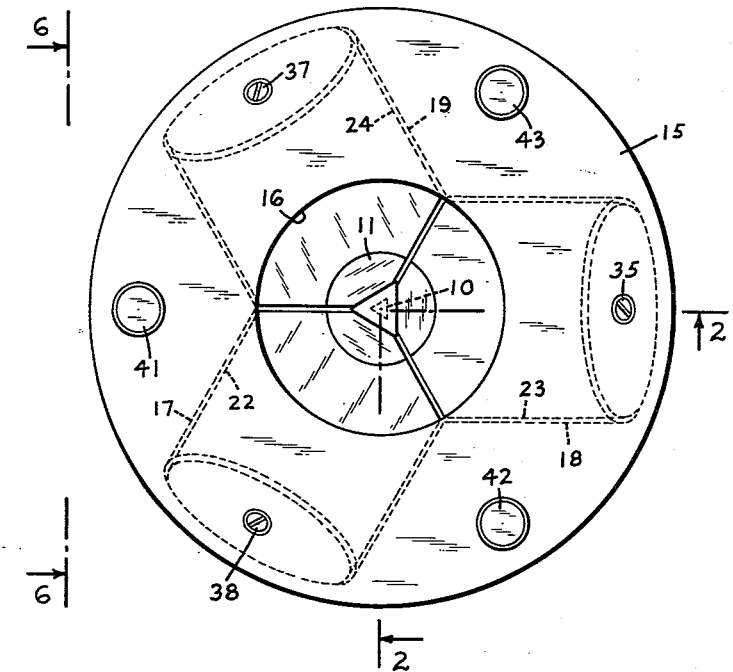
FIG. 1 is a plan view of a subassembly employed in one embodiment of the invention.
Figure 7:
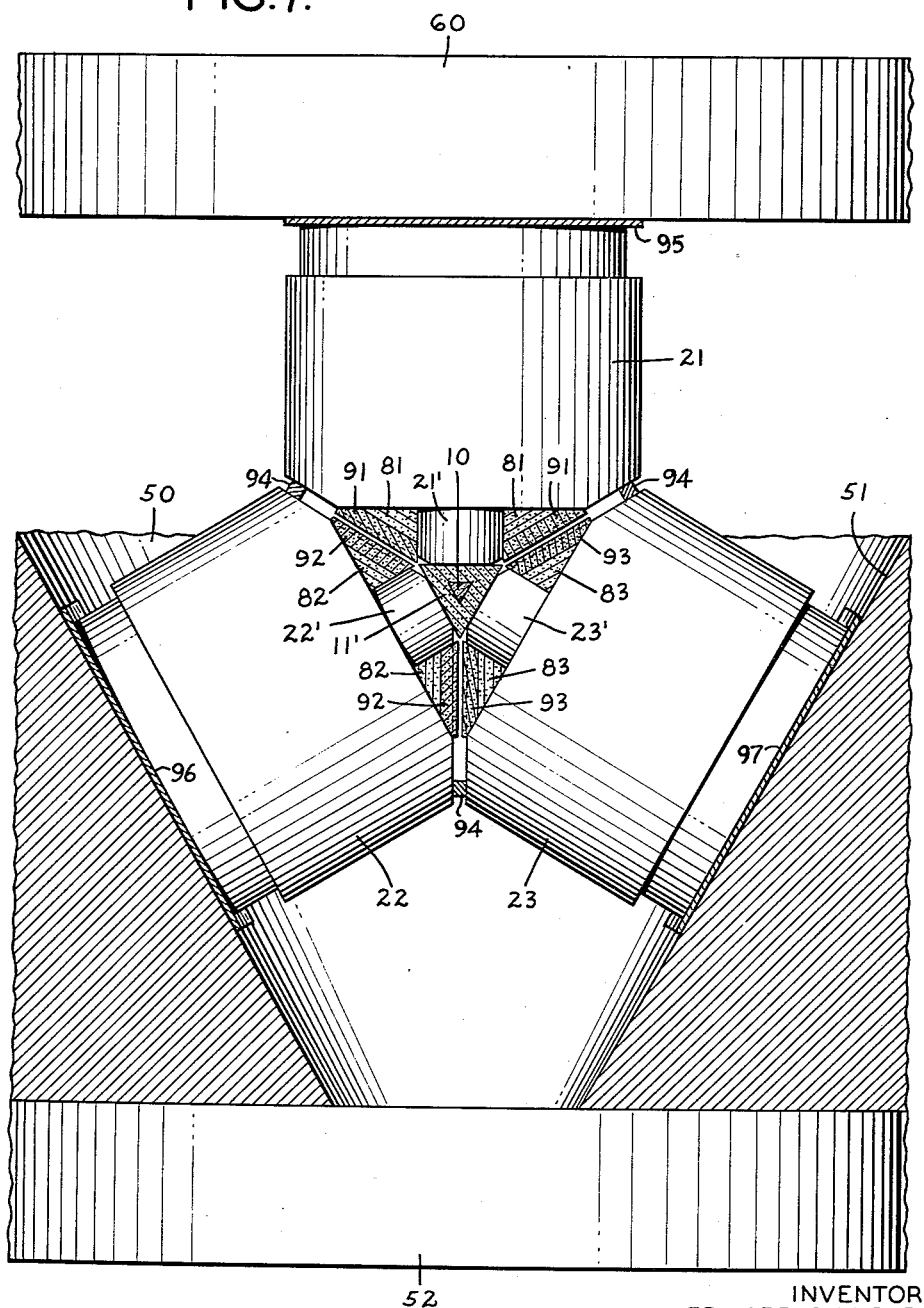

FIG. 6 is a front elevation which shows the complete assembly of an embodiment according to the invention, and which is taken partly in cross section to illustrate how the subassembly of FIG. 1 fits into the retaining ring of the complete assembly. In FIG. 6 the mentioned subassembly is viewed from the direction indicated by the arrows 6—6 in FIG. 1; and FIG. 7 is an elevational view of an embodiment of the invention giving a two-stage effect.

Referring now to FIG. 1, the numerals 10 and 11 designate, respectively, a sample to be compressed and a body of pyrophillite which enclose that sample, and which is in the form of a regular tetrahedron. The sample 10 may be inserted in the pyrophillite body 11 in the manner described by H. T. Hall in the aforementioned article in the Review of Scientific Instruments. Thus, the sample may be inserted alone or may be contained within a metal cylinder (not shown) which in turn is inserted within the pyrophillite body 11. If desired, electrical connections may be made to the cylinder by silver foil strips (not shown) which extend from the cylinder to the surface of the pyrophillite body 11 to provide respective electrical terminals in the form of metal tabs lying flat on the separate faces of such body.

Figure 2:
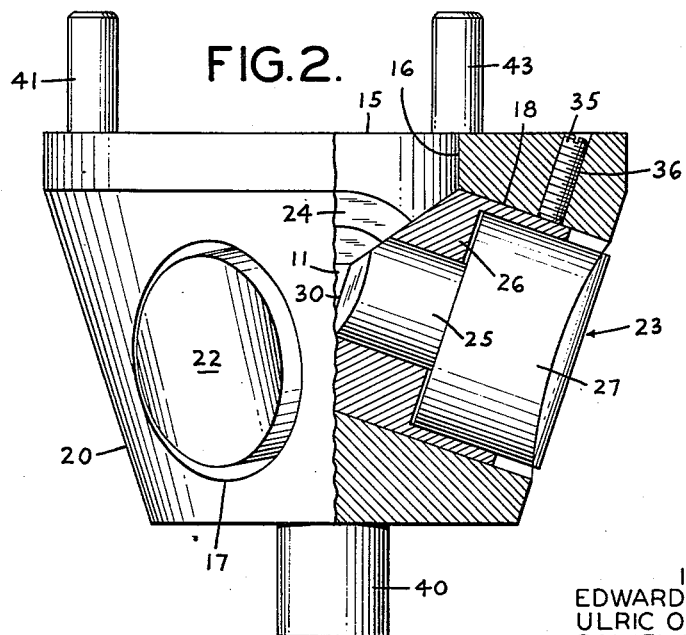
FIG. 2 is a front elevation of the subassembly of FIG. 1, this front elevation being taken partly in cross section as indicated by the arrows 2—2 in FIG. 1.

The tetrahedral body 11 is disposed in the central chamber of an anvil receiving block 15. This central chamber is provided in the block by the common intersection of four cylindrical bores formed therein, namely, a vertical bore 16 extending downwardly from the top of the block, and three other bores 17, 18, 19 disposed at 120° intervals about the periphery of the conically tapered side wall 20 of block 15. The side bores 17, 18, 19 extend from side wall 20 into the block in a direction which is predominantly horizontal, but which has an upward inclination (FIG. 2). The axes of the four bores 16—20 coincide with the four axes of the tetrahedral body 11 which pass at right angles to the faces of such body and through the centers of such faces to intersect at the center of the tetrahedron.

Each of the four bores in block 15 is adapted to receive an anvil. Thus, the bore 16 is adapted to receive therein an anvil 21 which, for convenience, is not shown in FIG. 1 but which is shown in FIG. 6. A plurality of anvils 22, 23, and 24 are shown in FIG. 1 as being received within the bores 17, 18, and 19, respectively. All of the anvils 21-24 have substantially the same structure as the anvil 23 whose construction appears in detail in FIG. 2 to which reference is now made.

The anvil 23 includes a hard end piece 25 with a truncated front end providing the anvil tip. The anvil also includes a bearing ring 26 and a pressure disk 27. The end piece 25 is received with a hard press fit within a forward bore of the bearing ring 26 which provides lateral support for the end piece. The pressure disk 27 is received with a close fit within a larger rearward bore of the bearing ring 26 to make contact with the rear end of the hard end piece 25. As later described in further detail, the rear face of the pressure disk 27 is machined to have a particular curvature.

FIGS. 3, 4 and 5 show details of the hard end piece 25. The front of this end piece is chamfered at 120° intervals around its periphery to produce a diminishing taper. This taper shapes the front contact face 30 of the end piece to be in the form of an equilateral triangle. The edges of this triangle are somewhat less in length than the edges of the equilateral triangle formed by the face of the pyrophillite body 11 with which the face 30 of end piece 25 is brought into contact.

Returning to FIG. 2, as shown therein, the slanting chamfer planes formed in the front end of end piece 25 are continued out to the cylindrical surface of bearing ring 26 by chamfering the front end of the bearing ring at 120° intervals and with the same inclination as the chamfers of the end piece. As also shown, the anvil 23 may be selectively locked in place or released by adjustment of a set screw 35 which is received in threaded relation within a hole 36 extending downwardly from the top of block 15 to enter the bore 18 at right angles to the axis of this bore. Similar set screws 37 and 38 (FIG. 1) are provided for the selective locking in place or releasing of the anvils 24 and 22, respectively.

To the end of guiding the anvil receiving block 15 in the complete assembly which is soon to be described, the block is provided at the bottom with a downstanding stem 40 and at the top with three upstanding pins 41, 42, 43, distributed at 120° intervals around the block.

Referring now to FIG. 6 which shows the completely assembled embodiment, in this complete assembly the anvil receiving block 15 is disposed within a retaining ring 50 having an inner wall 51 which is characterized by a conical taper from top to bottom. This ring 50 rests upon a lower bolster 52 in the form of a cylindrical disk having a central aperture 53 which receives in a slidable relation the stem 40 downstanding from the block 15. This lower bolster 52 is mounted upon the lower pressure plate 54 of a conventional hydraulic press which is not shown herein except for its pressure plates.

Above the ring 50 is positioned an upper bolster 60 which is likewise in the form of a cylindrical disk. This bolster 60 is mounted beneath and may be secured to the upper pressure plate 61 of the mentioned hydraulic press. Formed within the upper bolster 60 are three vertically extending apertures 62, 63, 64. These apertures respectively receive in slidable relation the posts 42, 43, and 41 upstanding from the block 15.

The underside of the upper bolster 60 engages with the upper or butt face of the anvil 21 which passes into the block 15 through the central vertical bore 16 (FIG. 1). This vertical anvil 21 is similar in construction to the predominantly horizontal anvils 22—24 excepting that the outer face of anvil 21 is planar (to make flat contact with bolster 60) rather than being curved as is the case of the butt faces of anvils 22—24.

During preliminary adjustment of the apparatus, the anvil 21 may be locked to the bolster 60 by an arrangement consisting of a clamping ring 67, secured to the underside of bolster 60, and of three set screws passing horizontally through the ring at 120° intervals around its periphery. Of these set screws, only the screw 65 is shown in FIG. 6. The screw 65 passes in threaded relation through hole 66 in ring 67 to engage the side of the anvil.

The anvil 21 includes a bearing or binding ring 68 which is a duplicate of the bearing ring 26 of anvil 23 (FIG. 2). The top of ring 68 is shown in FIG. 6. The lower part of ring 68 extends into the vertical bore 16 in block 15, and hence, it is hidden from view in FIG. 6.

When the block 15 is positioned in the ring 50, the butt faces of the predominantly horizontal anvils 22, 23, 24 project slightly beyond conically tapered side wall 20 of the block to press against the conically tapered inner wall 51 of the ring. The curvature of these butt faces is machined to match the curvature of the conical section of inner wall 51 which will be directly opposite those butt faces when the anvils 22—24 are at the point of maximum downward displacement. This point corresponds to the condition where, in the absence of body 11, each chamfered face of each anvil makes contact with the adjacent face of an adjacent anvil.

To the end of permitting free sliding of the butt faces of anvils 22—24 over inner wall 51, bearing sheets of polytetrafluoroethylene (for which the trademark is Teflon) of 0.003-inch thickness are inserted between those butt faces and the inner wall 51. Thus, as shown in FIG. 6, a sheet 70 of polytetrafluoroethylene is inserted between the butt face of anvil 22 and wall 51, and a sheet 71 of the same plastic material is inserted between the butt face of anvil 24 and the wall 51. Under the heavy pressures which are produced in the described apparatus, the mentioned plastic sheets serve as an excellent lubricant between the butt faces of anvils 22—24 and the inner wall 51 of the ring. Moreover, the plastic sheets serve to electrically insulate the anvils 22—24 from the ring.

Despite the lubricating effect of the plastic sheets, there remains a small frictional force opposing downward motion of the anvils 22—24 along the inner wall 51. In order to overcome this frictional force, the force transmitted to each of anvils 22—24 from anvil 21 is a force which must have a line of action diverging downwardly by ½ to 1° from the axis of each anvil rather than being coincident with such axis. In order to obtain this angular divergence between the axis of each predominantly horizontal anvil and the force impressed thereon from anvil 21, the inclination to the horizontal of the inner wall 51 of ring 50 is made steeper by about one degree than the inclination thereof which would be at right angles to the axis of the anvils 22—24. This more steeper inclination is provided when the angle between the axis of the cone defined by the taper of wall 51 and a line within the surface of such cone and passing through its apex is an angle having a value of 18.5°, i.e., a value of 1° greater than the 19.5° value which such angle would have if the inclination of wall 51 were to be at right angles to the axis of anvils 22—24.

The conically tapered side wall 20 of block 15 has the same 18.5° angle of taper as the wall 51 of the ring. The butt faces of anvils 22—24 are tipped about 1° from a lie exactly normal to the axis of those anvils in order for the lie of those butt faces to match the angle of taper of the conically tapered wall 51.

The FIG. 6 apparatus is operated by actuating the conventional hydraulic press (of which only the pressure plates 54, 61 are shown) to advance the upper plate 61 under pressure towards the lower plate 54. This pressure is transmitted through bolster 60 to anvil 21 to drive this anvil into the block 15. As anvil 21 drives inwardly, it presses against the top face of the tetrahedral body 11 of which the other three faces are contacted by the front faces of anvils 22—24. Hence, the pressure exerted by anvil 21 on pyrophillite body 11 is transmitted through this body to the other three anvils 22—24.

The downward movement of anvil 21 serves to produce both downward displacement of block 15 within ring 50 and downward sliding of the anvils 22—24 along the inner wall 51 of the ring. As the anvils 22—24 so slide downwardly, the conical taper of wall 51 develops wedging reaction forces which displace each of anvils 22—24 inwardly toward the pyrophillite body 11. The combination of the force applied to anvil 21 and the wedging reaction forces developed by wall 51 causes all four anvils to undergo simultaneous and substantially equal inward movement towards the body 11. Because of the configuration of the described apparatus, all four anvils exert equal pressure on this tetrahedral body.

During the compressing action, the block 15 is maintained in up-and-down alignment by the sliding fit of its downstanding stem 40 in the central aperture 53 of lower bolster 52 and by the sliding fits of the upstanding pins 41—43 in the holes 62—64 of the upper bolster 60. The lower bolster 52 prevents the bottom of ring 51 from cutting into the lower plate 54 of the hydraulic press. Similarly, the upper bolster 60 prevents the top of anvil 21 from cutting into the upper plate 61 of the press.

By continuing the advancement under pressure of upper plate 61 toward lower plate 54, the pressure on the tetrahedral pyrophillite body 11 is intensified until the body 11, and encased sample, have been compressed to the desired degree, or until the capacity of the hydraulic press has been reached. During the compression, some of the pyrophillite in the body 11 extrudes into the interstices between the front faces of the four anvils to form a gasket. The remaining pyrophillite transmits the pressure from the anvils to the encased sample to subject such sample to very high pressure as, say, pressure on the order of 125,000 atmospheres.

In a constructed embodiment of the apparatus which is shown in FIG. 6, each edge of the tetrahedral pyrophillite body 11 had a length of 9/16 inch. The edges of the triangular front faces of the anvils were slightly smaller, each such edge being ½ inch. The hard end pieces of the anvils were constructed of Allegheny Ludlum grade CA-4 tungsten carbide. The remaining parts of the anvils were made of SAE 4340 steel heat treated to Rockwell 40/41C, as was the conical ring 50. The anvil receiving block 15, the upper bolster plate 60 and the lower bolster plate 52 were all constructed of cold-rolled steel. The apparatus, as so constructed, was actuated by a hydraulic press capable of exerting a load of 100 tons. A stroke of 0.030 inch was required to increase the load from 5 tons to 100 tons. No evidence of permanent deformation of the ring or anvils was found after more than two cycles to a load of 100 tons.

In the course of experiment, it was found that the anvil receiving block 15 could be entirely dispensed with. In other words, the block 15 is not needed to maintain the four anvils in proper relative alignment during a compressing operation. In the absence of block 15, small plastic (e.g. nylon) spacers 94 in the form of buttons may be inserted in the gaps existing between the chamfered faces of the four anvils. These spacers 94 serve to hold the anvils in tetrahedral disposition prior to a pressing operation. The spacers are of low compressive strength and, hence, are easily flattened during such operation.

Elimination of the block 15 is desirable in that it simplifies the problem of insulating the anvils in the instance where, as described, electrical connections are made to the encased sample of material (or to an encased cylinder containing such sample) through silver foil terminals on the faces of the pyrophillite block 11, and where the anvils are placed in contact with such terminals to provide electrical lead-in or lead-out elements for current or voltage passing through the terminals. As already stated, the employment of plastic sheets 95—97 between the predominantly horizontal anvils and the ring 50 is an expedient which serves to insulate these particular anvils from the ring. A polytetrafluoroethylene sheet 95 may be inserted between anvil 21 and bolster 60 to electrically insulate that anvil from that bolster.

It will be appreciated from the foregoing that the anvil receiving block 15 is to be regarded as an optional element of the described apparatus, and that the only essential elements of such apparatus are the ring and the four anvils.

As so far described, the apparatus operates as a one-stage pressure device. However, the apparatus is also adapted for use as a two-stage pressure device. In such two-stage device, the primary stage is provided by the hitherto described system of which the anvils act as the primary stage anvils. Primary stage anvils 21, 22, 23 and 24 (the latter not shown in FIG. 7) and associated components are suitably made of large dimension to compress a large tetrahedron of material providing a pressure transmitting medium represented by reference numerals 81, 91, 82, 92 and 83, 93, respectively. This large tetrahedron encloses a smaller tetrahedron 11' of pressure transmitting material, and the small tetrahedron in turn encases the sample and the sample container, if any. Both tetrahedrons may be formed of pyrophillite. The small tetrahedron is disposed within the larger one to have the same center point and to have its edges parallel to those of the large tetrahedron.

Each of the four faces of the small tetrahedron is contacted by the smaller front face of one of four second-stage anvils 21', 22', 23' and 24' (the latter not shown) which are entirely constituted of hard material such as tungsten-carbide, and which may each be similar in shape to the end piece 25 shown in FIGS. 3, 4, and 5. The rear faces of the second stage anvils are smaller in area than the front faces of the first-stage anvils. The second-stage anvils are designed so that, when the rear face of each second-stage anvil bears against the front face of a corresponding first-stage anvil in such manner that the juxtaposed anvils are coaxial and in a relative angular disposition about their common axis to produce angular registration between each chamfered face of one anvil and a corresponding chamfered face of the other anvil, the chamfered faces of the second-stage anvil each are coplanar with the angularly registering chamfered face of the end piece of the first-stage anvil.

The second-stage anvils are aligned relative to the small tetrahedron in the same way as the previously-described anvils 21—24 are aligned relative to the previously-described pyrophillite tetrahedron 11. The bodies of the four second-stage anvils are encased by the material of the large tetrahedron, and the larger rear faces of the second-stage anvils are disposed to be exactly or approximately flush with the faces of the large tetrahedron.

In operation, the front faces of the first-stage anvils are brought into contact with the rear faces of the second-stage anvils to exert pressure thereon. While the compression of the sample is taking place, the large tetrahedron provides lateral support for the second-stage anvils to minimize deformation thereof by the high stresses produced therein from the pressures exerted thereon by the first-stage anvils.

The mode by which the large tetrahedron provides lateral support for the second-stage anvils is as follows. For the most part, the large tetrahedron is made up of pyrophillite or of a pressure transmitting material having properties under pressure which are similar to those exhibited by pyrophillite. Such materials have the disadvantage, however, that they undergo only a small percentage decrease in volume under high pressure. Therefore, if the large tetrahedron were to be constituted entirely of, say, pyrophillite, the distance by which the first-stage anvils could be driven into the large tetrahedron would be almost entirely dependent upon the relative amount of pyrophillite in the large tetrahedron which can be extruded between the anvils. This amount of extruded pyrophillite is, however, never very large in a practically workable apparatus. Hence, if the large tetrahedron were constituted entirely of pyrophillite, the first-stage anvils would be limited to a very short stroke and would be relatively ineffective.

This difficulty is overcome by incorporating in the large tetrahedron a mass or masses or a material adapted to undergo a volume transition at a predetermined high pressure so as to shrink in volume at that pressure such as ammonium formate, potassium cyanide, ammonium pentaborate, magnesium sulfate-$H_2O$, potassium chloride and Teflon as described by P. W. Bridgeman in the Proceedings of the American Academy of Arts and Sciences, volume 76, 1944–48, pages 72–87. For example, potassium chloride has a transition at 20,000 atmospheres and is accompanied by an 11% volume shrinkage. The location of the volume transition material within the pyrophillite of the large tetrahedron is not critical, and it may be, for example, scattered in pockets within the pyrophillite. Conveniently, however, the potassium chloride or other volume transition material may be packed around the cylindrical wall of each second-stage anvil to form a ring of material of triangular cross section which outwardly does not extend quite so far as the planes defined by the chamfered faces of the first- and second-stage anvils as shown by 81, 82, 83 in FIG. 7. This ring of volume transition material is overlain by the pyrophillite of the large tetrahedron represented by reference numerals 91, 92, and 93, respectively.

When a given first-stage anvil is driven inwardly, the associated ring of volume transition material starts to markedly shrink in volume at the time when the pressure generated in the overlying pyrophillite reaches the critical value at which the volume transition of the material takes place. If the material is potassium chloride, the transition point is at a pressure of about 20,000 atmospheres. Thereafter as the first stage continues its stroke, the volume transition material continues to shrink in volume while exerting a constant pressure of the transition point value against the second-stage anvil. By proper design, this constant transition point pressure may be maintained until the first-stage anvil reaches the end of its stroke. The second-stage anvil is thereby laterally supported at constant high pressure during the entire compressing operation. As is known from the article by P. W. Bridgeman entitled, "Physics Above 20,000 kg./cm.²" appearing in 1950 on pages 1–17, vol. A203 of the Proceedings of the Royal Society (London), lateral support of this sort increases considerably the maximum value of working pressure which can be transmitted through the second-stage anvil.

As an alternative to the employment of separate sets of primary anvils and secondary anvils, the anvils in each tandem pair of primary anvil and a secondary anvil may be combined into a single anvil. This single anvil includes a front part of hard material (e.g. cemented tungsten carbide) which is analogous to the second-stage anvil in the tandem pair, a rear part of like hard material which is analogous to the hard end piece of the first-stage anvil in the tandem pair, and a bearing ring and pressure disk associated with the rear part in the same way as the ring 26 and disk 27 are associated with the hard end piece 25 in FIG. 2. The chamfered faces of the front part are coplanar with the chamfered faces of the rear part. However, the front part is demarcated from the rear part by shaping the single anvil to have a circumferential notch, channel, rabbet or the like, which forms in the hard material a sizeable circumferential recess disposed inwardly of the planes of the chamfered faces, and separating the chamfered faces of the front part from those of the rear part.

As a matter of convenience, the pyrophillite material of the large tetrahedron may be fabricated into preformed gasket bodies of which each is fitted loosely into the recess of one of the anvils or anvil combinations to extend about the circumference of the recess. Each such gasket when in uncompressed condition extends slightly outwards of the planes defined by the chamfered faces of the anvil or anvil combinations. Thus, when all four anvils or anvil combinations are simultaneously driven inwardly against the central tetrahedral object, each given gasket is squeezed between the body of its own anvil or anvil combination and the faces adjacent to the given gasket of the gaskets on the anvils or anvil combination adjacent the given anvil or anvil combination. Each such gasket is shaped to enclose and contain beneath itself the described ring of volume transition material. FIG. 7 shows a two-stage arrangement having first- and second-stage anvils, the mentioned preformed gaskets and the mentioned rings of volume transition material.

The above-described embodiment being exemplary only, it will be understood that the invention herein comprehends embodiments differing in form and/or detail from the embodiments which have been specifically disclosed. For example, the object which is compressed may be increased in size from the example given to have an edge length of, say, three inches, the size of the anvils and associated components being suitably scaled to the size of the object. Lubricating means other than polytetrafluoroethylene sheets may be employed to render the butt faces of the predominantly horizontal anvils relatively free sliding over the tapered wall of the restraining member.

Thus, oil, graphite, molybdenum disulfide, or lead or indium foil sheets coated with a lubricating mixture as, say, a mixture of graphite and glycerine, are all suitable for use as lubricants. The anvil-receiving block may be constituted of an insulating material such as Lucite, for example, in order to assure electrical insulation between the block and the anvils. Accordingly, the invention is not to be considered as limited save as is consonant with the scope of the following claims.

What is claimed is:

1. Apparatus for compressing an object in the form of a regular tetrahedron comprising, four anvils tetrahedrally disposed about said object to present the front faces thereof towards said object, a first of said anvils being drivable in the direction of its axis by an operating force, a ring coaxial with said first anvil and enclosing the other three anvils, said ring having an inner wall which tapers conically to close towards said axis with increasing distance from said first anvil, said wall providing a slide surface for the butt faces of the other three anvils whereby said three anvils by wedging action drive against said object simultaneously with the driving thereagainst of said first anvil.

2. Apparatus as in claim 1 further comprising lubricating means disposed between at least one of said other anvils and the opposite portion of slide surface.

3. Apparatus as in claim 2, in which said lubricating means comprises a sheet of synthetic resinous material adapted under pressure to act as a lubricant.

4. Apparatus as in claim 3, in which said sheet is constituted of polytetrafluoroethylene and in which the conical taper of said inner wall defines a geometric cone having a value of about 18.5° for the angle between the cone axis and a line lying in the cone surface and passing through the cone apex.

5. Apparatus for compressing an object in the form of a regular tetrahedron comprising, four anvils tetrahedrally disposed about said object to present the front faces thereof toward said object, the first of said anvils being drivable in the direction of its axis by an operating force, a ring coaxial with said first anvil and enclosing the other three anvils, said ring having an inner wall which tapers conically to close towards said axis with increasing distance from said first anvil and said wall providing a slide surface for the butt faces of the other three anvils whereby said three anvils by a wedging action drive against said object simultaneously with the driving thereagainst of said first anvil, and a plurality of sheets of synthetic resinous material of which each is disposed between said inner wall and the butt face of one of said other three anvils, each such sheet being adapted to act as lubricant between said wall and said butt face.

6. Apparatus for compressing an object in the form of a regular tetrahedron comprising, four anvils tetrahedrally disposed about said object to present the front faces therein toward said object, a first of said anvils being drivable in the direction of its axis by an operating force against said object, an anvil receiving block perforated by four bores within which slide said four anvils, said bores intersecting to form in said block a chamber containing said object, and the butt faces of all said anvils projecting out of said block beyond said bores, and a ring coaxial with said first anvil and enclosing said block and the butt faces of the other three anvils, said ring having an inner wall which tapers conically to close towards said axis with increasing distance from said first anvil, and said wall providing for the butt faces of the other three anvils a slide surface adapted by wedging action to drive such three anvils against said object simultaneously with the driving thereagainst of said first anvil.

7. Apparatus as in claim 6 further comprising a first bolster transverse to said ring at the end thereof away from said first anvil, a second bolster transverse to the butt face of said first anvil for pressing it against said object, each of said bolsters having formed therein at least one aperture extending in the axial direction of said first anvil, and guide elements extending from said block and slidably fitted within the bolster apertures to steady said block within said ring.

8. Apparatus comprising, anvil means having a first forwardly diminishing taper at the front, a second forward diminishing taper which is to the rear of and a continuation of said first taper, and a circumferential recess formed within the geometric surface defined by and lying between said first and second tapers, said apparatus also comprising a body of pressure-transmitting material received within said recess and extending about said recess and beyond said surface and a body of material held in said recess by said pressure-transmitting material and adapted to undergo a volume transition under high pressure.

References Cited in the file of this patent
UNITED STATES PATENTS

| | | |
|---|---|---|
| 698,115 | Hird | Apr. 22, 1902 |
| 1,386,003 | Kempton | Aug. 2, 1921 |
| 2,483,803 | Bridgeman et al. | Oct. 4, 1949 |
| 2,918,699 | Hall | Dec. 29, 1959 |
| 2,941,245 | Cheney | June 21, 1960 |
| 2,968,837 | Zeitlin et al. | Jan. 24, 1961 |